United States Patent [19]

Bodenheimer

[11] Patent Number: 5,292,096
[45] Date of Patent: Mar. 8, 1994

[54] APPARATUS FOR REMOVABLY MOUNTING A GENERATOR UNIT TO A PAIR OF PARALLEL SPACED APART FLANGED BEAMS

[75] Inventor: Bert A. Bodenheimer, Stamford, Conn.

[73] Assignee: B. A. Bodenheimer & Co., Stamford, Conn.

[21] Appl. No.: 69,201

[22] Filed: May 28, 1993

[51] Int. Cl.[5] .................................. A47B 96/06
[52] U.S. Cl. ............................ 248/228; 248/637; 248/645
[58] Field of Search ............... 248/675, 645, 637, 674, 248/231.4, 235.5, 228; 24/525, 522, 569, 514, 490

[56] References Cited

U.S. PATENT DOCUMENTS

| | | | |
|---|---|---|---|
| 640,654 | 1/1900 | Haarmann | 248/228 X |
| 912,760 | 2/1909 | Voegeli | 248/228 X |
| 1,786,004 | 12/1930 | Clayton | 248/228 |
| 1,836,197 | 12/1931 | Soule | 248/228 X |
| 1,925,867 | 9/1933 | Dunlop | 248/228 X |
| 2,003,498 | 6/1935 | Wenner | 24/525 X |
| 2,313,594 | 3/1943 | Smith | 248/228 |
| 4,472,917 | 9/1984 | Alderton | 24/525 X |
| 4,732,360 | 3/1988 | Bodenheimer | 248/645 |
| 4,834,401 | 5/1989 | Harrington | 248/228 X |

FOREIGN PATENT DOCUMENTS 506898 11/1954 Canada .................................. 24/525

Primary Examiner—J. Franklin Foss
Attorney, Agent, or Firm—David P. Gordon

[57] ABSTRACT

An apparatus for removably mounting a device such as a generator unit to a pair of parallel spaced apart I-beams includes a cross member having a pair of slots at opposite ends and a pair of clamp plates removably bolted to the cross member through respective slots. A separate upstanding sliding guide is mounted between each clamp plate and the cross member. Each clamp plate is a substantially rectangular member with an oblong cutout and at least one notch. Each upstanding sliding guide is a substantially L-shaped bracket having a downward extending fixing pin, an oblong cutout, and a raised tooth therebetween. The slots each include two or more circular pin receiving openings having diameters somewhat larger than the width of the slot. Each upstanding sliding guide is positionable relative to a respective slot in two or more fixed positions defined by the circular pin receiving openings in the slot which receive the downward extending fixing pin of the sliding guide. Each clamp plate is positionable relative to a respective sliding guide in two or more fixed positions at least one of which is defined by the notch on the clamp plate engaging the raised tooth of the sliding guide. A bolt is secured through the oblong cutouts of each respective clamp plate and sliding guide and through a respective slot in the cross member.

20 Claims, 4 Drawing Sheets

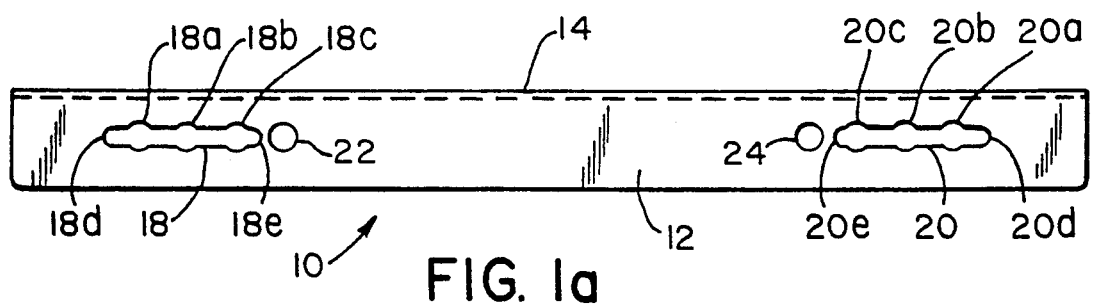
FIG. 1a
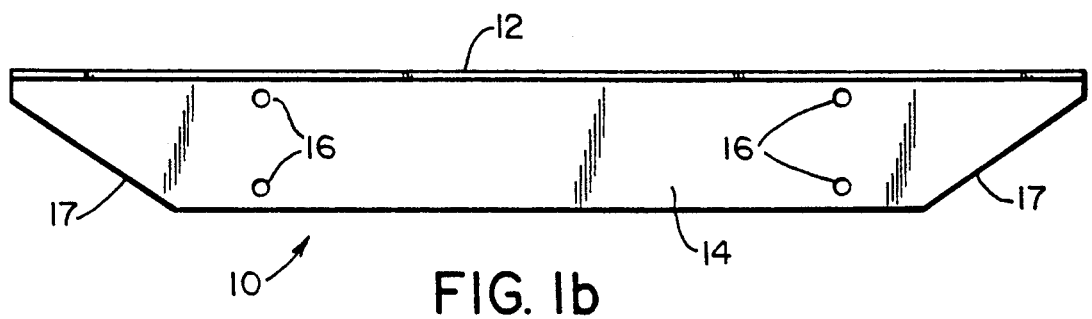
FIG. 1b
FIG. 2
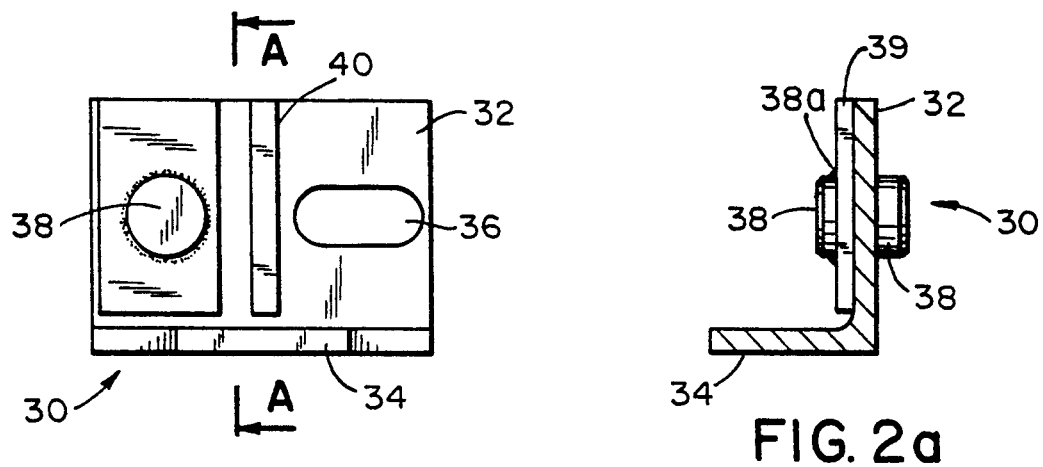
FIG. 2a
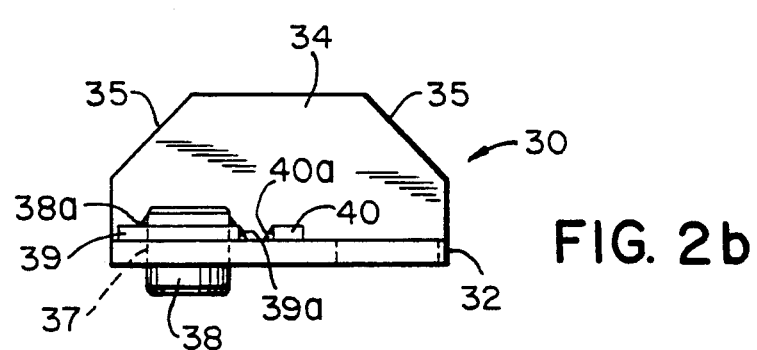
FIG. 2b

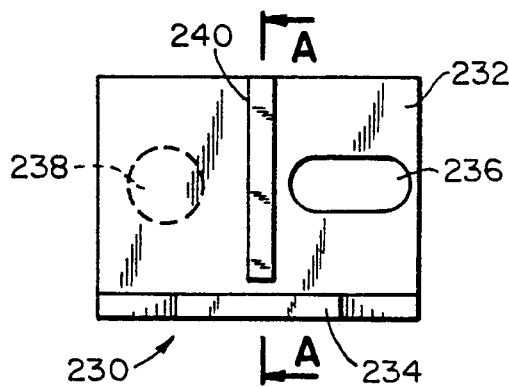
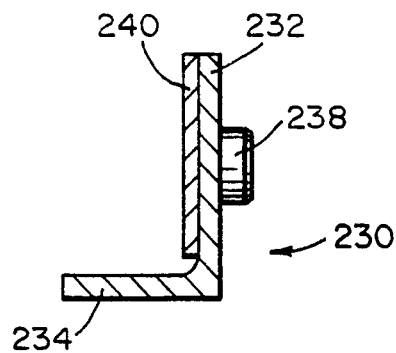
FIG. 4
FIG. 4a
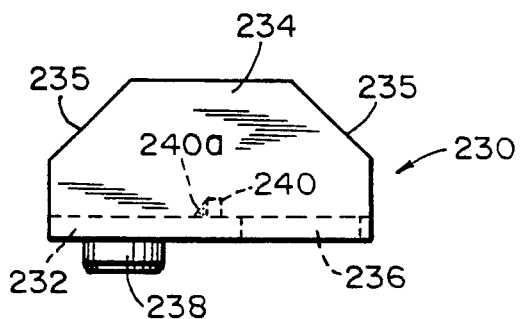
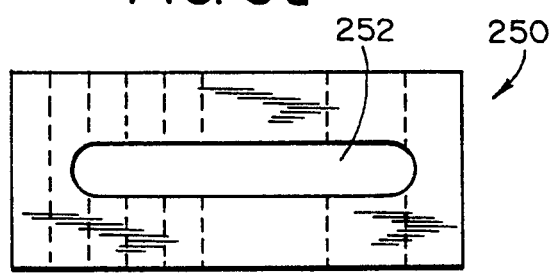
FIG. 4b
FIG. 5a
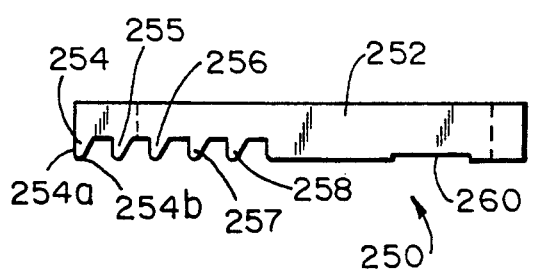
FIG. 5b
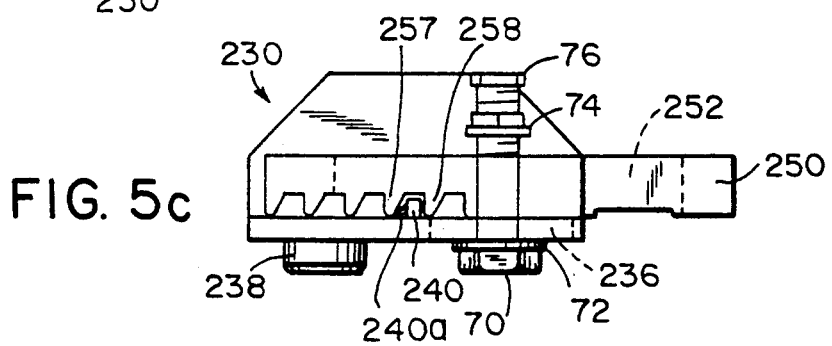
FIG. 5c

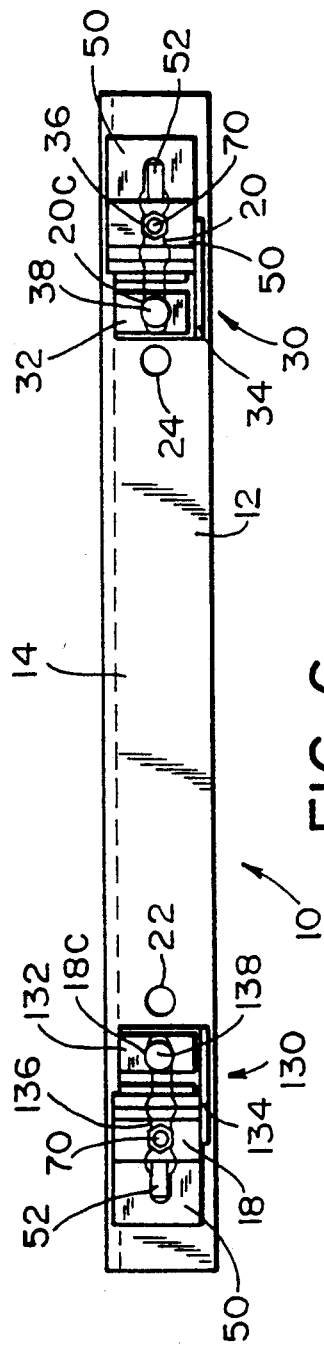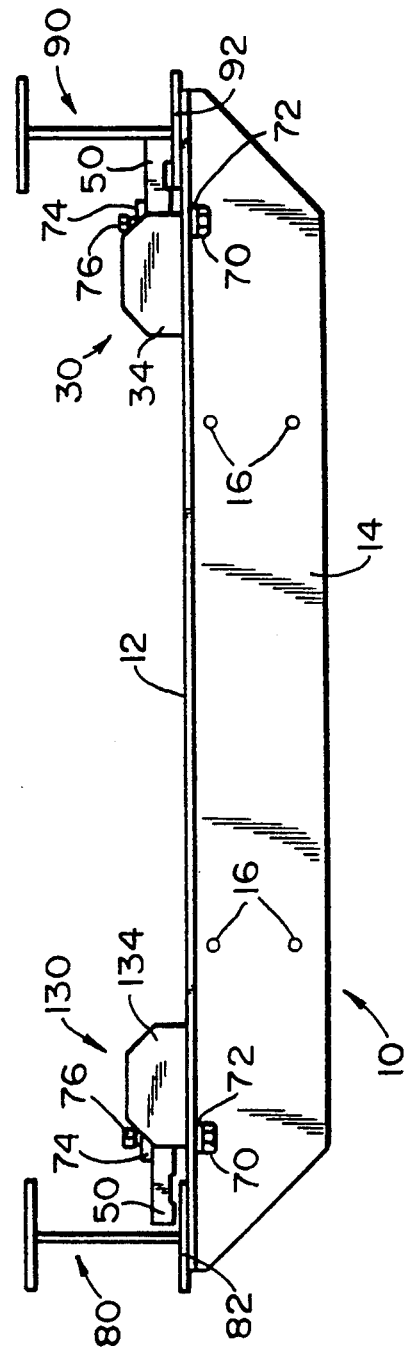

ated freight containers which are transportable by truck, rail, and ship, are well known in the art. Electric generator units which attach either to a chassis transporting such a container, or which attach directly to the refrigerated freight containers to provide the necessary power for refrigeration are also known in the art. Standards for such refrigerated freight containers and their attachments have been promulgated by ANSI and ISO and specify loads and fittings to be used with containers transported in international commerce.

APPARATUS FOR REMOVABLY MOUNTING A GENERATOR UNIT TO A PAIR OF PARALLEL SPACED APART FLANGED BEAMS

This application is related to co-owned U.S. Pat. No. 4,732,360 which is incorporated herein by reference.

BACKGROUND OF THE INVENTION

1. Field of the Invention

The invention relates to a mechanism for removably mounting devices to a pair of parallel spaced apart flanged beams. More particularly, the invention relates to means for removably mounting electrical generator units used with refrigerated containers to a pair of parallel spaced apart I-beams, where the I-beams are not spaced by a known distance.

2. State of the Art

Refrigerated freight containers which are transportable by truck, rail, and ship, are well known in the art. Electric generator units which attach either to a chassis transporting such a container, or which attach directly to the refrigerated freight containers to provide the necessary power for refrigeration are also known in the art. Standards for such refrigerated freight containers and their attachments have been promulgated by ANSI and ISO and specify loads and fittings to be used with containers transported in international commerce.

Those skilled in the art will recognize that different requirements present themselves for each mode of transportation or the containers. For example, generators are usually mounted in either of the "clip-on" or "underslung" configurations. U.S. Pat. No. 4,732,360 discloses a combination underslung and clip-on front wall mounted electrical generator unit housing for use with refrigerated freight containers. In the underslung mode, four foldable arms are extended to provide what is substantially two cross members which are clamped to a pair of parallel I-beams of a truck chassis. The cross members are provided with bolt holes and movable rectangular clamps with oblong cutouts are bolted to the cross members. The cross members are brought under the I-beams and the each clamp is positioned so that a bottom horizontal portion of the I-beam (i.e., the I-beam flange) resides between the cross member and the clamp. The clamps are then bolted tightly to the cross member. The oblong cutouts of the clamps allow for a certain sliding latitude in positioning the clamps relative to the cross members and the I-beams. An upstanding side wall portion of the cross member adjacent each clamp limits rotation of the clamp. The underslung clamping arrangement of U.S. Pat. No. 4,732,360 can also be used with C-beams. Regardless, the arrangement assumes that the beams are a specific distance apart (e.g., thirty-two inches), with flanges of a specified size.

While the underslung clamping arrangement of U.S. Pat. No. 4,732,360 provides many advantages, it is somewhat limited in its adaptability to beams which are not spaced apart the pre-specified distance. In fact, it is not unusual for these electrical generator units to be mounted to beams which are spaced anywhere from thirty-two to forty-five inches or more apart. Moreover, while the upstanding portions of the cross members do limit rotational movement of the rectangular clamps, the placing of the upstanding portions further limits the adaptability to beams which are not spaced apart by the specified distance.

SUMMARY OF THE INVENTION

It is therefore an object of the invention to provide a cross member and associated clamps for removably mounting a device attached thereto to a pair of parallel spaced apart flanged beams when the flanged beams may be spaced at any of several distances.

It is also an object of the invention to provide upstanding means for limiting rotational movement of clamps which upstanding means do not limit the adaptability of the clamps to I-beams which are spaced apart by different distances.

It is another object of the invention to provide means for limiting the sliding movement of clamps even when clamp bolts are less than fully tightened.

In accord with these objects which will be discussed in detail below, the apparatus for removably mounting a generator unit or other device to a pair of parallel spaced apart flanged beams of the present invention includes at least one cross member having a pair of spaced apart slots and a pair of clamp plates which are bolted to the cross member through respective slots. A separate upstanding sliding guide is mounted between each clamp plate and the cross member. Each clamp plate is a substantially rectangular member with an oblong cutout and either an end step, in one embodiment, or two or more facial teeth, in another embodiment. Each upstanding sliding guide is a substantially L-shaped bracket having a downward extending fixing pin, a preferably oblong cutout, and a raised tooth therebetween.

The spaced apart slots in the cross member are each arranged at opposite ends of the cross member and each includes two or more circular pin receiving openings having diameters somewhat larger than the width of the slot. Each upstanding sliding guide is positionable relative to a respective slot in two or more fixed positions defined by the circular pin receiving openings in the slot which receive the downward extending fixing pin of the sliding guide. Each clamp plate is positionable relative to a respective sliding guide in preferably two or more fixed positions defined by the oblong cutout of the clamp plate and by the facial teeth or the end step on the clamp plate which engage the raised tooth of the sliding guide. A bolt is secured through the oblong cutouts of each respective clamp plate and sliding guide and through a respective slot in the cross member. As the bolt secures both the clamp plate and the sliding guide, the sliding guide is prevented from rotational movement by the spaced apart bolt and fixing pin in the slot of the cross member. Sliding movement of the clamp plate is prevented by the interaction of its facial teeth or its end step with the raised tooth on the sliding guide. Rotational movement of the clamp plate is limited by the upstanding L-portion of the sliding guide. The sliding guides are laterally positionable as described to accommodate beams spaced apart by any distance likely to be encountered, and the clamp plates are laterally positionable as described to further accommodate these differencces as well as differences in the width of the beam flanges.

Preferred aspects of the invention include: providing the facial teeth and raised tooth with angled sides to facilitate movement of the clamp plate in an outward direction relative to the sliding guide and hinder movement in the inward direction; forming the cutouts and slots with the same widths and providing each with rounded ends of the same radius; providing each slot with three pin receiving holes and providing a fourth pin receiving hole adjacent each slot on an inner portion of the cross member; providing the bolt with a captive screw which prevents the bolt from disconnecting from the assembly and becoming lost; and dimensioning the slots and pin receiving holes to accommodate I-beams spaced apart at distances from thirty-three to forty-six inches.

Additional objects and advantages of the invention will become apparent to those skilled in the art upon reference to the detailed description taken in conjunction with the provided figures. dr

BRIEF DESCRIPTION OF THE DRAWINGS

FIG. 1a is a top view of a cross member according to the invention showing left and right spaced apart slots with pin receiving holes;

FIG. 1b is a side elevation view of the cross member of FIG. 1a;

FIG. 2 is a top view of a sliding guide mountable in the right hand slot of the cross member of FIG. 1a;

FIG. 2a is a cross section of the sliding guide of FIG. 2 along line A—A;

FIG. 2b is a transparent side elevation view of the sliding guide of FIG. 2;

FIG. 3b is a side elevation view of the clamp plate of FIG. 3a;

FIG. 4 is a top view of a second embodiment of a sliding guide mountable in the right hand slot of the cross member of FIG. 1a;

FIG. 4a is a cross section of the sliding guide of FIG. 4 along line A—A;

FIG. 4b is a side elevation view of the sliding guide of FIG. 4;

FIG. 5a is a top view of a second embodiment of a clamp plate mountable on the sliding guide of FIG. 4;

FIG. 5b is a side elevation view of the clamp plate of FIG. 5a;

FIG. 5c is a partially transparent view of FIGS. 4b and 5b combined in conjunction with a connecting bolt;

FIG. 6 is a transparent top view of the cross member of FIG. 1a with left and right sliding guides and clamp plates mounted thereon; and FIG. 7 is a side elevation view of the cross member, sliding guides, and clamp plates of FIG. 4 attached to a pair of parallel spaced apart I-beams.

DETAILED DESCRIPTION OF THE PREFERRED EMBODIMENTS

Figure 3A:
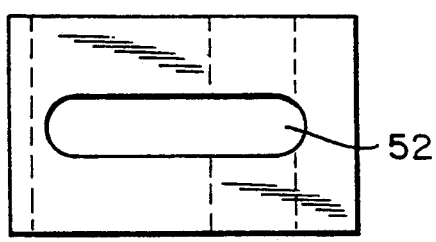
FIG. 3a is a top view of a clamp plate mountable on the sliding guide of FIG. 2.

Referring now to FIGS. 1a and 1b, cross member 10 according to the invention is preferably an L-shaped structural angle bracket preferably approximately five sixteenths inch thick having a horizontal top portion 12 and a vertical side portion 14. Top portion 12 is preferably fifty-two inches long by three and a half inches wide. Side portion 14 is preferably approximately five inches tall and is provided with mounting holes 16 for attachment to a generator unit or other device (not shown). It will be appreciated that the location and size of holes 16 will depend on the device which is to be attached to the cross member. Moreover, in the case of a generator unit, it will be understood by those skilled in the art that preferably two cross members 10 (front and rear) will be used to mount a generator unit and that the arrangement and size of holes 16 may be different in each of the cross members. Side portion 14 may also be provided with lower end angle cuts 17 to allow access to parts of a generator unit attached to the cross members 10. Additionally, it will be appreciated that the cross members 10 may each comprise a pair of folding arms as shown in U.S. Pat. No. 4,732,360, or otherwise made of two parts or arms each bolted separately to the generator unit or other device.

The top portion 12 of cross member 10 is provided with two spaced apart slots 18, 20 which are preferably approximately 0.7 inches wide and approximately 7.4 inches long end to end. Slots 18, 20 preferably have rounded ends 18d, 18e, respectively 20d, 20e with radii of approximately 0.35 inches. Outer ends 18d, respectively 20d are preferably located approximately 4.4 inches from their respective edge of the cross member.

In accord with the invention, slots 18, 20 are respectively provided with pin receiving holes 18a, 18b, 18c, and 20a, 20b, 20c, each having a preferred diameter of approximately 1 inch and being spaced approximately 2.25 inches apart center to center. Additional pin receiving holes 22, 24 are preferably placed adjacent inner ends 18e and 20e of slots 18, 20 and are spaced approximately 2.25 inches from the next closest pin receiving hole 18c and 20c. If desired, the slots 18, 20 could extend to and include the additional pin receiving holes 22, 24.

Turning now to FIGS. 2, 2a, and 2b, a sliding guide 30 according to the invention is an L-shaped structural angle bracket preferably approximately five-sixteenths inch thick having a horizontal bottom portion 32 and an upstanding vertical side portion 34. Bottom portion 32 is preferably approximately three inches by four inches and side portion 34 is preferably approximately two inches by four inches. Side portion is preferably provided with angled top cuts 35 for guiding the assembly during installation and for allowing easier access to the bottom portion 32 as will be described below.

The bottom portion 32 of sliding guide 30 is provided with a cutout 36 which is preferably oblong shape having a width of approximately 0.7 inches, rounded ends having radii of approximately 0.35 inches and an overall length of approximately 1.6 inches. The oblong cutout 36 is located on one side of the bottom portion as shown in FIG. 2. The other side of the bottom portion is provided with a circular bore 37 into which a downward extending fixing pin 38 is inserted. Fixing pin 38 is preferably welded at 38a to a three-sixteenths inch thick reinforcing plate 39 which in turn is welded at 39a to the bottom portion 32 of the sliding guide 30. The fixing pin has a preferred diameter of approximately one inch and a length of approximately one and one eighth inches. It extends approximately 0.44 inches from the bottom of bottom portion 32 as shown in FIG. 2b. In between the fixing pin and the oblong cutout, a raised tooth 40 is welded at 40a to the bottom portion 32 of the sliding guide 30.

It will be appreciated that the sliding guide 30 described above is designed for use with slot 20 of the cross member 10 as will be described in detail below with reference to FIGS. 6 and 7, although the guide and plate can be rotated together when the fixing pin is disengaged so that clamping can be accomplished at the other flange of the I-beams. It will be understood that in the described embodiment, the sliding guide 30 is not wholly symmetrical and that a mirror image sliding guide (130 in FIGS. 6 and 7) could be provided if desired for slot 18.

Figure 3B:
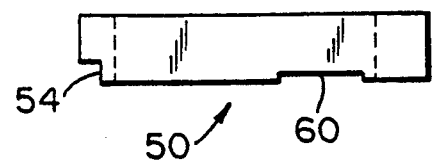

Turning now to FIGS. 3a and 3b, a clamp plate 50 according to the invention is a rectangular piece of three quarter inch thick, approximately two and a half inches wide by approximately four inches long. Clamp plate 50 is provided with an oblong cutout 52 having a width of approximately 0.7 inches and an overall length of approximately 4.1 inches. Rounded ends of the cutout 52 have radii of approximately 0.35 inches. A lower face of the clamp plate is provided with a 0.75 inch stepped or notched end 54 to receive the raised tooth of the sliding guide. In addition, a recess 60 is provided on the gripping end of the clamp plate. The recess 60 permits the clamp plate 50 to clear the edge of the flange of the I-beam when the clamp plate is angled relative to the I-beam, and thereby to apply the load as close to the web of the I-beam as possible. In this manner, different I-beam flange thicknesses are accommodated.

Figure 3C:
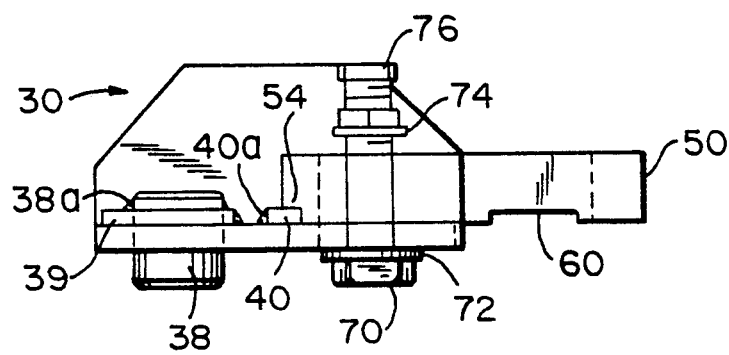
FIG. 3c is a partially transparent view of FIGS. 2b and 3b combined in conjunction with a connecting bolt where the sliding guide is in, a first position relative to the clamp plate.

FIG. 3c shows the sliding guide 30 with a clamp plate 50 attached to it by a bolt 70, washer 72, movable nut 74, and fixed nut 76. It will be appreciated that the loosening of nut 74 allows the lateral positioning of the clamp plate 50 relative to the sliding guide 30. Conversely, tightening of nut 74 down on the clamp plate 50 fixes the clamp plate relative to the sliding guide 30. Fixed nut 76 guarantees that bolt 70 will not detach from the assembly and become lost. The raised tooth 40 abuts the notched end 54 of the clamp plate 50 to prevent unwanted lateral sliding of the clamp plate away from the I-beam (see FIG. 7).

Figure 3D:
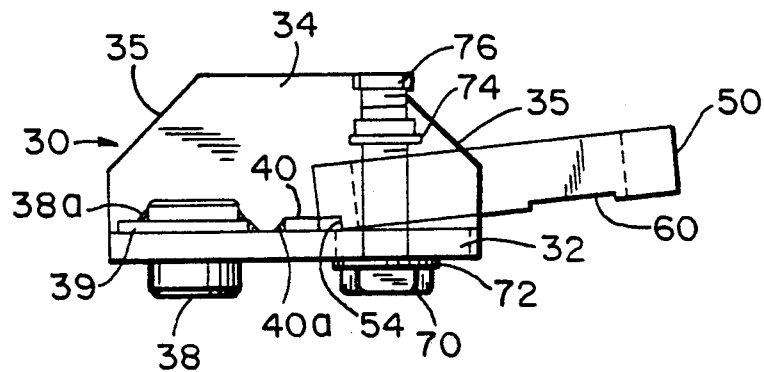
FIG. 3d is a partially transparent view of FIGS. 2b and 3b combined in conjunction with a connecting bolt where the sliding guide is in a second position relative to the clamp plate.

Turning to FIG. 3d, the same sliding guide 30 and clamp plate 50 are seen attached by bolt 70. Here, however, the clamp plate 50 is slightly angled such that the rear edge 54a of the clamp plate 50 is seen engaging tooth 40 of the sliding guide. Thus, it will be appreciated that the clamp plate 30 can take either of two fixed positions relative to sliding guide 50.

FIGS. 4, 4a, and 4b show an alternate embodiment of a sliding guide 230 used with an alternate embodiment of a clamp plate 250 which is shown in FIGS. 5a and 5b. FIG. 5c shows these embodiments together. In FIGS. 4, 4a, and 4b, the sliding guide 230 is similar to the sliding guide 30 described above. Here, however, the horizontal bottom portion 232, upstanding vertical side portion 234 and fixing pin 238 are cast as a single unit. This leaves the upper surface of the bottom portion 232 smooth and unobstructed. Dimensionally, the sliding guide 230 is substantially the same as sliding guide 30, including the dimensions of cutout 236 and raised tooth 240. In this embodiment, raised tooth 240 is formed or welded at 240a in a manner similar to the embodiment of sliding guide 30. Sliding guide 230 is interchangeable with sliding guide 30 for use with clamp plate 50 on cross member 10 described above. However, the cast construction of sliding guide 230 allows the use of different kind of clamp plate (250 in FIGS. 5a-5c).

Turning now to FIGS. 5a-5c, clamp plate 250 is similar to to clamp plate 50 in that it is also a rectangular piece, three quarters of an inch thick and two and one half inches wide. However, clamp plate 250 is longer than clamp plate 50, and is approximately five and seven eighths inches long. Cutout 252 is also correspondingly longer, approximately four and one half inches. Instead of a single notched end, clamp plate 252 is provided with a plurality of facial teeth 254-258 beginning at one end of the clamp plate and being spaced approximately one half inch apart. Each tooth, such as tooth 254, has a vertical portion 254a, a 0.06 inch radius rounded tip 254b, and a 30 degree angled slope 254c. The altitude of each such tooth is approximately 0.28 inches.

FIG. 5c shows the sliding guide 230 with clamp plate 250 attached to it by a bolt 70, washer 72, movable nut 74, and fixed nut 76. It will be appreciated that a loosening of the movable nut 74 allows the lateral positioning of the clamp plate 250 relative to the sliding guide 230. Conversely, tightening of movable nut 74 onto clamp plate 250 fixes the clamp plate relative to the sliding guide 230. The raised tooth 240 resides between adjacent facial teeth on the clamp plate. In FIG. 5c, raised tooth 240 resides between facial teeth 257, 258. As in all of the preferred embodiments, bolt 70 is preferably a $\frac{5}{8}$-18 × 3 hex head bolt and is preferably inserted with its washer 72 from beneath Slots 18, 20 through the oblong cutouts 36, 136 (236) of the sliding guides 30, 130 (230) and through the oblong cutouts 52 (252) of the clamp plates 50 (250). A movable hexagonal nut 74 is placed over and threaded on the end of each bolt 70, while another nut 76 or stop member is preferably welded or fixed on the top of the bolt. In this manner, bolt 70 is held captive to prevent the loss thereof.

Figure 3E:
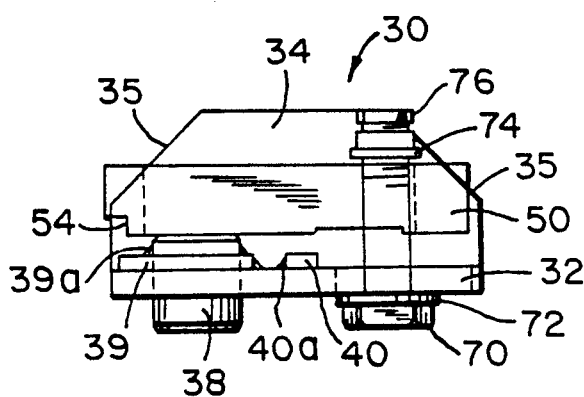
FIG. 3e is a partially transparent view of FIGS. 2b and 3b combined in conjunction with a connecting bolt where the sliding guide is in a retracted position.

FIG. 6 shows a top view of the cross member, sliding guides and clamp plates assembled, and FIG. 7 shows a side view of the assembled parts attached to two parallel spaced apart I- beams 80, 90. Prior to its attachment to the I-beams, typically, the clamp plates 50, are slid into a non-extended position as seen in FIG. 3e. The entire assembly may then be brought into proximity of the I-beams 80, 90. The sliding guides 30, 130 may then be positioned as desired in the slots 18 and 20 of the cross beam 10. In fact, even with the bolt 70 extending through the cross beam 10, the sliding guide 30, and the clamp plate 50, the sliding guide and clamp plate 50 may be rotated about the bolt 70 so as to cause a clamping of the other side of the I-beam.

Once the right and left sliding guides 30, 130 are arranged respectively over the desired slots 20, 18 in the top portion 12 of cross member 10, the fixing pins 38, 138 of the sliding guides are inserted into appropriate pin receiving holes (in this example 20c and 18c respectively). With the fixing pins in their holes, and the bolts 70 in their holes, the sliding guides 30, 130 are prevented from rotation. So long as the movable nuts 74 are not tightened, however, the clamp plates 50 (250) are slideable as guided by the side portions of the sliding guides to different lateral positions defined by the engagement of their facial teeth or notched end with the raised tooth of the respective sliding guide (shown best in FIGS. 3c, 3d and 5c).

As shown in FIG. 7, two parallel spaced apart I-beams 80, 90, each have lower flanges 82, 92 which are clamped by the apparatus of the invention to removably mount the cross member thereto. As shown, although it is not required, the sliding guides are arranged so that their side portions 34, 134 face the same side of the cross member 10, preferably spaced apart from the vertical side portion 14 of the cross member. Those skilled in the art will appreciate that the sliding guides 30, 130 are positioned in the slots 18, 20 of the cross member to be as close as possible to I-beams 80, 90 and clamp plates 50 are positioned to cover as much of the flange 82, 92 as possible before the nuts 74 are tightened to bolts 70. Upon tightening nuts 74, a C-clamp action is effected by the clamp plates and cross member against flanges 82, 92 of the I-beams. The clamp plates are prevented from rotating out of position (through the effects of vibration etc.) by the side portions 34, 134 of sliding guides 30, 130 which in turn are prevented from rotating out of position by their fixing pins 38, 138 spaced apart from bolts 70. The clamp plates 50 are further prevented from sliding laterally away from flanges 82, 92 by the engagement of the teeth described above, even when nuts 74 are not fully tightened.

There have been described and illustrated herein means for removably mounting a cross member to a pair of parallel spaced apart I-beams. While particular embodiments of the invention have been described, it is not intended that the invention be limited thereto, as it is intended that the invention be as broad in scope as the art will allow and that the specification be read likewise. Thus, while particular shapes of the upstanding wall portion of the sliding guide have been disclosed, it will be appreciated that other shapes could be utilized. Also, while specific configurations of the notch or facial teeth of the clamp plate and raised tooth of the sliding guide have been shown, it will be recognized that other types of teeth or notches could be used with similar results obtained. Moreover, while particular configurations have been disclosed in reference to the fixing pin of the sliding guide, it will be appreciated that other configurations could be used as well. Furthermore, while the cross member has been disclosed as having a certain number of pin receiving holes spaced apart within slots, it will be understood that different arrangements can achieve the same or similar function as disclosed herein. Additionally, while certain specific dimensions have been disclosed, it will be understood that the dimensions given are for example only and that other dimensions could accomplish substantially the same results. It will therefore be appreciated by those skilled in the art that yet other modifications could be made to the provided invention without deviating from its spirit and scope as so claimed.

I claim:

1. Apparatus for removably mounting a device having a pair of slots to a pair of parallel spaced apart flanged beams, comprising:
   a) a pair of sliding guides, each sliding guide having a base portion and an upstanding side wall, a first cutout, and a raised tooth;
   b) a pair of fixing pins extending downward from respective of said base portions of said sliding guides;
   c) a pair of clamp plate means, each clamp plate means having a second cutout which is longer than wide, and at least one notch which engages said raised tooth of respective of said sliding guides, said pair of clamp plate means for engaging respective of the pair of parallel spaced apart flanged beams;
   d) a pair of bolts which couple said sliding guides and said clamp plates to respective of the slots in the device, wherein
   each sliding guide is positionable over a respective slot such that said fixing pin extends into the slot, each clamp plate means being positionable over a respective sliding guide such that said raised tooth abuts said at least one notch, each bolt being insertable through said first and second cutouts and a respective slot.

2. Apparatus according to claim 1, wherein:
   each of the slots is provided with a plurality of pin receiving holes having a diameter larger than a width of a remainder of the slot, and
   each fixing pin has a diameter larger than the width of the remainder of the slot.

3. Apparatus according to claim 1, wherein:
   the device has a pin receiving hole adjacent each of the slots, and
   each sliding guide is positionable over a respective of the slots such that said fixing pin extends into one of the pin receiving hole and the slot.

4. Apparatus according to claim 1, wherein:
   said raised tooth has a substantially vertical side and a substantially ramped side.

5. Apparatus according to claim 1, wherein:
   said at least one notch is located at one end of said clamp plate means.

6. Apparatus according to claim 1, wherein:
   said at least one notch comprises a plurality of facial teeth.

7. Apparatus according to claim 6, wherein:
   said facial teeth each have a substantially vertical side and a substantially ramped side such that movement of said clamp plate means relative to said sliding guides is facilitated in one direction and impaired in an opposite direction.

8. Apparatus according to claim 1, wherein:
   each said fixing pin is integral with a respective base portion.

9. Apparatus according to claim 1, wherein:
   said first and second cutouts are substantially oblong.

10. Apparatus according to claim 1, further comprising:
    e) a pair of nuts screwed onto said bolts, wherein said nuts fix respective of said clamp plate means relative to respective of said sliding guides; and
    f) stop means on said bolts to prevent said nuts from coming off of said bolts.

11. Apparatus for removably mounting a device to a pair of parallel spaced apart flanged beams, comprising:
    a) at least one cross member attached to said device and having a pair of slots, each slot being located on a horizontal portion on opposite sides of said at least one cross member;
    b) a pair of sliding guides, each sliding guide having a base portion and an upstanding side wall, said base portion a first cutout, and a raised tooth;
    c) a pair of fixing pins extending downward from said base portions of said sliding guides;
    d) a pair of clamp plate means, each clamp plate means having a second cutout which is longer than wide, and at least one notch, said clamp plate means for engaging respective of said pair of parallel spaced apart flanged beams; and
    e) a pair of bolts for coupling said sliding guide means and said clamp plate means to respective slots in said at least one cross member, wherein
    each sliding guide is positionable over a respective slot such that said fixing pin extends into said slot, each clamp plate means being positionable over a respective sliding guide such that said raised tooth abuts said at least one notch, each bolt being insertable through said first and second cutouts and a respective slot.

12. Apparatus according to claim 11, wherein:
each slot is provided with a plurality of receiving holes having a diameter larger than a width of a remainder of said slot and
each fixing pin has a diameter larger than said width of said remainder of said slot.

13. Apparatus according to claim 11, further comprising:
f) a pin receiving hole adjacent each of said slots, wherein each sliding guide is positionable over a respective slot such that said fixing pin extends into one of said pin receiving hole and said slot.

14. Apparatus according to claim 11, wherein:
said raised tooth has a substantially vertical side and a substantially ramped side.

15. Apparatus according to claim 11, wherein:
said at least one notch is located at one end of said clamp plate means.

16. Apparatus according to claim 11, wherein:
said at least one notch comprises a plurality of facial teeth.

17. Apparatus according to claim 16, wherein:
said facial teeth each have a substantially vertical side and a substantially ramped side such that movement of said clamp plate relative to said sliding guides is facilitated in one direction and impaired in an opposite direction.

18. Apparatus according to claim 11, wherein:
each said fixing pin is integral with a respective base portion.

19. Apparatus according to claim 11, wherein:
said first and second cutouts are substantially oblong.

20. Apparatus according to claim 11, further comprising:
f) a pair of nuts screwed onto said bolts, wherein said nuts fix respective of said clamp plate means relative to respective of said sliding guides; and
g) stop means on said bolts to prevent said nuts from coming off of said bolts.

* * * * *